Figure 1:
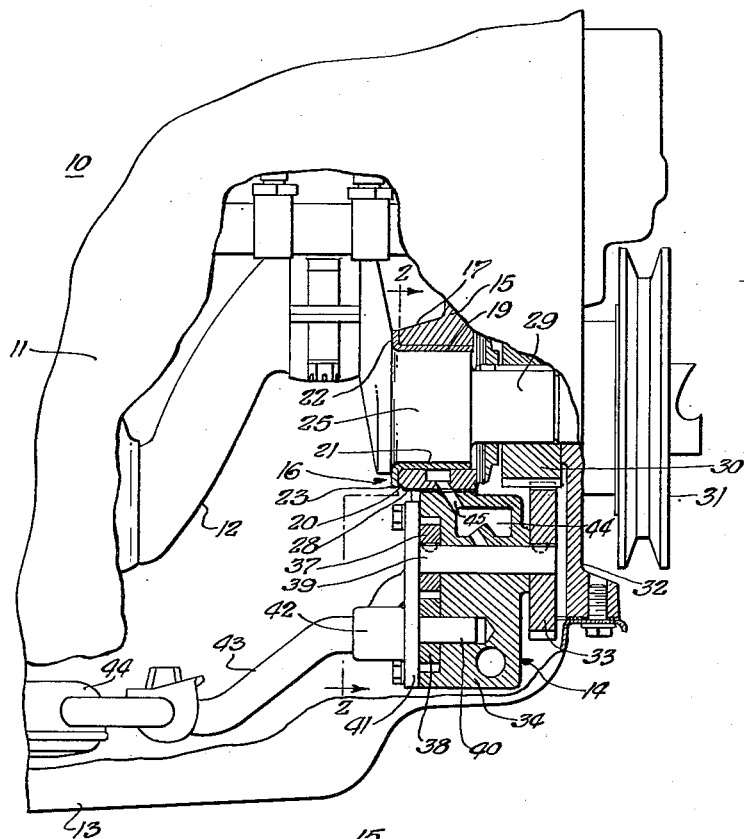

Oct. 23, 1951 F. H. DAVIS 2,572,250
OIL PUMP ASSEMBLY
Filed April 6, 1945

Inventor.
Fred H. Davis:
By Thiess, Olson & Mecklenburger
Attys.

Patented Oct. 23, 1951

2,572,250

UNITED STATES PATENT OFFICE 2,572,250

OIL PUMP ASSEMBLY

Fred H. Davis, Rock Island, Ill., assignor to J. I. Case Company, Racine, Wis., a corporation of Wisconsin Application April 6, 1945, Serial No. 586,862

9 Claims. (Cl. 184—6)

This invention relates to pump and bearing constructions, more particularly to an oil pump and crankshaft bearing construction for internal combustion engines, compressors or the like and it is an object of the invention to provide an improved pump and bearing construction of the character indicated.

It is a further object of the invention to provide an improved oil pump assembly for an internal combustion engine that is easy to assemble, is rigid in construction, requires few additional parts and is economical to make.

Oil pumps for internal combustion engines or the like are relatively small units but even so they are sufficiently bulky as to require space to be made for them and the pump mounting must be relatively rigid in character. In view of these considerations it has been suggested that oil pumps mounted inside of the oil pan be made integral with one of the main bearings of the engine crankshaft but such prior suggestions have not met with satisfaction because the bearing structure became complicated and did not function in the best manner. Furthermore, in such prior suggestions either a worn out bearing or pump usually required replacing both parts. Furthermore, this construction had no provision whereby the pump could be attached to a standard motor already equipped with its own bearings without removing one of the bearing halves and replacing it with a non-standard bearing and pump assembly. Accordingly, it is a further object of the invention to provide an improved pump and bearing construction of the character indicated in which the oil pump casing is a unit separate from but is attachable to the removable bearing cap of a crankshaft bearing.

It is a further object of the invention to provide an improved removable bearing cap for a crankshaft bearing whereby related engine apparatus, such as oil pumps or the like, may be attached thereto by the same means as for attaching the bearing cap to the engine crankcase.

According to one form of the invention, a bearing adapted to support an engine shaft including an engine gear, the bearing having a fixed part and a removable part attachable thereto, is provided. An independent oil pump including an operating gear is associated with the removable part and means are provided for attaching the oil pump and the removable bearing part to the fixed part of the bearing so that the pump operating gear and the engine gear are in mesh with each other. More specifically the removable bearing part is provided with a substantially flat surface and the pump has a casing also provided with a substantially flat surface which flat surfaces are in registry with each other when the pump is attached to the relatively fixed bearing part.

Referring to the drawing.

Figure 2:
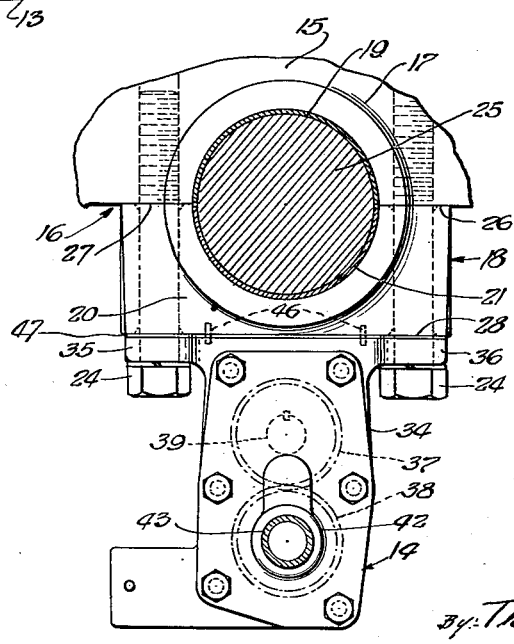

Fig. 1 is a fragmentary view of an internal combustion engine, partially broken away, embodying the invention; and Fig. 2 is an elevational view partially in section taken substantially along the lines 2—2 of Fig. 1.

Referring more particularly to the drawing, the invention is embodied in an internal combustion engine 10 including a crankcase 11, a crankshaft 12 supported in the crankcase 11 and an oil pan 13 which forms a chamber with the crankcase in which the crankshaft rotates, and which houses the oil pump 14 and other engine parts as well as forming an oil sump or reservoir.

While the invention will be described in connection with internal combustion engines, it will be apparent to those skilled in this art that changes may be made to adapt the invention for use with compressors, pumps and the like without departing from the true spirit and scope of the invention.

The crankcase 11 is of a well known construction having end walls and transverse partitions formed integrally with the crankcase, which end walls and partitions form the supports for the main crankshaft bearings, only the end wall 15 supporting the front main bearing 16 being shown since all of the main bearings are substantially similar. The main bearing 16 consists of an upper semicylindrical member 17 and a lower removable member or bearing cap 18, the upper member 17 being integral with the end wall 15, as shown, and being provided with a bearing member 19 which is also semicylindrical in form and is received in the semicylindrical member 17. The lower removable member or bearing cap 18 comprises a body or bearing block 20 having an internal semicylindrical surface into which is received a semicylindrical bearing member 21. The bearing members 19 and 21 together form a substantially cylindrical bearing surface for the crankshaft and also include the circumferential flanges 22 and 23, respectively, which form a bearing surface to withstand any end thrust the crankshaft 12 may have during the course of engine operation.

The crankshaft 12 is supported by means of the main crankshaft bearings in the crankcase 11. To complete the front main bearing 16 for its part in supporting the crankshaft the bearing cap 18 is attached to the end wall 15 by means of bolts 24 which pass through holes provided in the bearing block 20 and are threaded into corresponding holes in the end wall 15. The forward end of the crankshaft 12 includes a bearing surface 25 which is received between the bearing members 19 and 21, as shown. In order for the bearing block 20 to seat properly and to have sufficient supporting area, relatively large flat surfaces 26 and 27 are provided on one side of the bearing block which flat surfaces bear against corresponding flat surfaces on the end member 15 as is well understood. In addition to the flat surfaces 26 and 27 on one side, the bearing block 20 includes the flat surface 28 on the other side for a purpose to be described. The surface 28 extends over the whole area of the bearing block, is substantially parallel to the surfaces 26 and 27 and is spaced therefrom a sufficient distance so that the bearing block is sufficiently thick at its thinnest point to give the necessary strength to the bearing cap 18.

With the crankshaft 12 assembled into the engine crankcase 11 as thus far described it is apparent that the bottom of the oil pan 13 must be spaced below the main bearings a distance sufficient to allow the crankshaft to rotate without touching the bottom of the oil pan. Furthermore, since the oil pan is used as an oil sump the oil pan must be sufficiently deep so that the crankshaft will not spash in the oil contained in the oil sump. The cranks of the crankshaft being axially spaced from each other, it is clear that there is considerable space in the engine crankcase and oil pan. Extending forwardly from the bearing surface 25 on the crankshaft 12 there is a shaft extension 29 onto which the timing gear 30 is keyed and the grooved fan pulley 31 is attached. The timing gear 30 is used to drive the engine cam shaft through another gear as is well understood. The cover plate 32 is used to protect the timing gears and the oil pan 13 is attached at its forward end to the cover plate 32 to completely enclose the engine crankcase. Since the timing gear 30 is spaced forwardly from the bearing surface 25, which necessitates spacing the cover plate 32 ahead of the timing gear, a convenient space directly beneath the front main bearing 16 is provided into which space the oil pump 14 and its operating gear 33 are mounted.

The oil pump 14 includes a rigid casing 34 from which the bosses 35 and 36 extend laterally, the bosses and the portion of the pump casing between them constituting an attaching head having a substantially flat surface corresponding to the flat surface 28 on the bearing block. The bosses 35 and 36 are provided with holes through which the bolts 24 pass to attach the oil pump 14 as well as the bearing cap 18 to the end wall 15. In order to properly position the pump casing 34 relative to the bearing block 20 without depending on the bolts 24, the dowel pins 46 are provided, the dowel pins being fixed to the pump casing and being received in suitably positioned holes in the bearing block 20. Shims 47 are placed between the pump casing and the bearing block as shown so that the proper spacing of the gears 30 and 33 may be obtained. Sufficient shims are provided to enable the gears to run correctly on the pitch line in spite of variations in manufacture. The oil pump 14 is of a type well known as a gear pump having a pair of gears 37 and 38 in mesh with each other in a gear chamber forming part of the housing or casing 34. The gear 37 is the driving gear of the pump and is keyed to a shaft 39 which shaft is keyed to the pump driving gear 33 which is in mesh with the timing gear 30. The gear 38 is mounted on an idle shaft 40 rotatable in a bearing formed in the pump housing. The gears 37 and 38 are held in place by a cover plate 41 having a pipe boss 42 extending therefrom and communicating with the inside of the gear chamber to form an oil intake. Extending from the pipe boss 42 is the oil intake pipe 43 at the other end of which is an oil strainer 44 which lies in the bottom of the oil pan 13 attached to the crankcase 11 and forming an oil sump or reservoir. An oil outlet passage is formed within the pump casing and communicates with the chamber 44 from which oil is carried through the passageway 45 into an opening in the bearing block 20 to carry oil to the front main bearing 16 and to the remainder of the engine.

Attaching the oil pump casing to the end wall 15 as described provides a rigid mounting for the oil pump and furthermore through the proximity of the front main bearing to the timing gear 30 provides for driving the pump through the meshing of gears 33 and 30 thereby eliminating the necessity for a special driving connection for the oil pump. The bearing block 20 and the oil pump casing are complementary structures in that the same bolts are used to attach both members to the engine and they have corresponding surfaces in contact with each other through which a passageway carries oil to lubricate the engine. Stresses and strains in either the pump casing or the bearing block do not affect the other member and if either part must be replaced for any reason it is not necessary to replace the other part.

While a particular embodiment of the invention has been shown it will be understood, of course, that the invention is not limited thereto since many modifications may be made, and it is, therefore, contemplated by the appended claims to cover any such modifications as come within the true spirit and scope of the invention.

Having thus described the invention, what is claimed and desired to be secured by Letters Patent is:

1. The combination with a crankshaft of an internal combustion engine, housing means for said crank comprising a crank case in which the crankshaft rotates and a two-part front bearing therefor comprising a fixed half bearing and a detachable cap having a mating half bearing, of a drive rotor mounted on the front end of said shaft in front of said front bearing, an oil pump for supplying oil to said bearing mounted on said cap, and transmission from said drive rotor to said oil pump, the said housing means comprising a portion extending in front of said drive rotor and transmission, and a portion extending underneath said oil pump.

2. The combination with a crankshaft of an internal combustion engine, housing means for said crank comprising a crank case in which the crankshaft rotates and a two-part front bearing therefor comprising a fixed bearing and a detachable cap having a mating half bearing, of a drive rotor mounted on the front end of said shaft in front of said front bearing, an oil pump for supplying oil to said bearing mounted on said cap, and transmission from said drive rotor to said oil pump, the said housing means comprising a portion extending in front of said drive rotor and transmission, and a portion extending underneath said oil pump, said pump comprising two intermeshing pump gears having axes parallel to the axis of the crankshaft.

3. The combination with a crankshaft of an internal combustion engine, housing means for said crank comprising a crank case in which the crankshaft rotates and a two-part front bearing therefor comprising a fixed half bearing and a detachable cap having a mating half bearing, of a drive rotor mounted on the front end of said shaft in front of said front bearing, an oil pump for supplying oil to said bearing mounted on said cap, and transmission from said drive rotor to said oil pump, the said housing means comprising a portion extending in front of said drive rotor and transmission, and a portion extending underneath said oil pump, said pump being detachably secured in position with respect to said bearing cap.

4. The combination with a crankshaft of an internal combustion engine, housing means for said crank comprising a crank case in which the crankshaft rotates and a two-part front bearing therefor comprising a fixed half bearing and a detachable cap having a mating half bearing, of a drive rotor mounted on the front end of said shaft in front of said front bearing, an oil pump for supplying oil to said bearing mounted on said cap, and transmission from said drive rotor to said oil pump, the said housing means comprising a portion extending in front of said drive rotor and transmission, and a portion extending underneath said oil pump, said pump comprising two intermeshing pump gears having axes parallel to the axis of the crankshaft and said pump being detachably secured in position with respect to said bearing cap.

5. The combination with a crankshaft of an internal combustion engine and a two-part front bearing therefor comprising a fixed half bearing and a detachable cap having a mating half bearing, of a drive rotor mounted on the front end of said shaft in front of said front bearing, an oil pump for supplying oil to said bearing mounted on said cap, transmission from said drive rotor to said oil pump, said pump being detachably secured in position with respect to said bearing cap, and common fastening means for securing the pump and bearing cap to said fixed half bearing.

6. The combination with a crankshaft of an internal combustion engine and a two-part front bearing therefor comprising a fixed half bearing and a detachable cap having a mating half bearing, of a drive rotor mounted on the front end of said shaft in front of said front bearing, an oil pump for supplying oil to said bearing mounted on said cap, transmission from said drive rotor to said oil pump, said pump being detachably secured in position with respect to said bearing cap, and common fastening means for securing the pump and bearing cap to said fixed half bearing, said common fastening means including bolts secured to said fixed half bearing extending through said cap and pump.

7. The combination with a crankshaft of an internal combustion engine, housing means for said crank comprising a crank case in which the crankshaft rotates and a two-part front bearing therefor comprising a fixed half bearing and a detachable cap having a mating half bearing, of a gear mounted on the front end of said shaft in front of said front bearing, an oil pump for supplying oil to said bearing mounted on said cap, and transmission from said gear to said oil pump, said housing means comprising a portion extending in front of said gear and transmission, and a portion extending underneath said oil pump.

8. The combination with a crankshaft of an internal combustion engine, housing means for said crank comprising a crank case in which the crankshaft rotates and a two-part front bearing therefor comprising a fixed half bearing and a detachable cap having a mating half bearing, of a gear mounted on the front end of said shaft in front of said front bearing, an oil pump for supplying oil to said bearing mounted on said cap, and transmission from said gear to said oil pump, said pump comprising two intermeshing pump gears having axes parallel to the axis of the crankshaft, said transmission comprising a gear rotatable with one of said pump gears, said housing means comprising a portion extending in front of said gear and transmission, and a portion extending underneath said oil pump.

9. The combination with a crankshaft of an internal combustion engine, housing means for said crank comprising a crank case in which the crankshaft rotates and a two-part front bearing therefor comprising a fixed half bearing and a detachable cap having a mating half bearing, of a drive gear mounted on the front end of said shaft in front of said front bearing, an oil pump for supplying oil to said bearing mounted on said cap, and transmission from said drive gear to said oil pump, said pump comprising two intermeshing pump gears having axes parallel to the axis of the crankshaft, said transmission comprising a gear rotatable with one of said pump gears and meshing with said drive gear, said housing means comprising a portion extending in front of said gear and transmission, and a portion extending underneath said oil pump.

FRED H. DAVIS.

REFERENCES CITED

The following references are of record in the file of this patent:

UNITED STATES PATENTS

| Number | Name | Date |
|---|---|---|
| 1,170,663 | Nelson | Feb. 8, 1916 |
| 1,381,150 | White | June 14, 1921 |
| 1,456,461 | Page | May 22, 1923 |
| 1,634,123 | Taub | June 28, 1927 |
| 1,641,221 | Eyer | Sept. 6, 1927 |
| 1,658,979 | Fisher | Feb. 14, 1928 |
| 1,909,965 | Jacoby | May 23, 1933 |
| 2,177,724 | Kishline | Oct. 31, 1939 |
| 2,355,217 | Hamann | Aug. 8, 1944 |

FOREIGN PATENTS

| Number | Country | Date |
|---|---|---|
| 313,021 | Germany | Mar. 15, 1917 |
| 548,176 | Great Britain | Sept. 29, 1942 |